March 12, 1946. E. E. SHAVER ET AL 2,396,442
PORTABLE POWER CABLE SKINNER
Filed Sept. 20, 1943
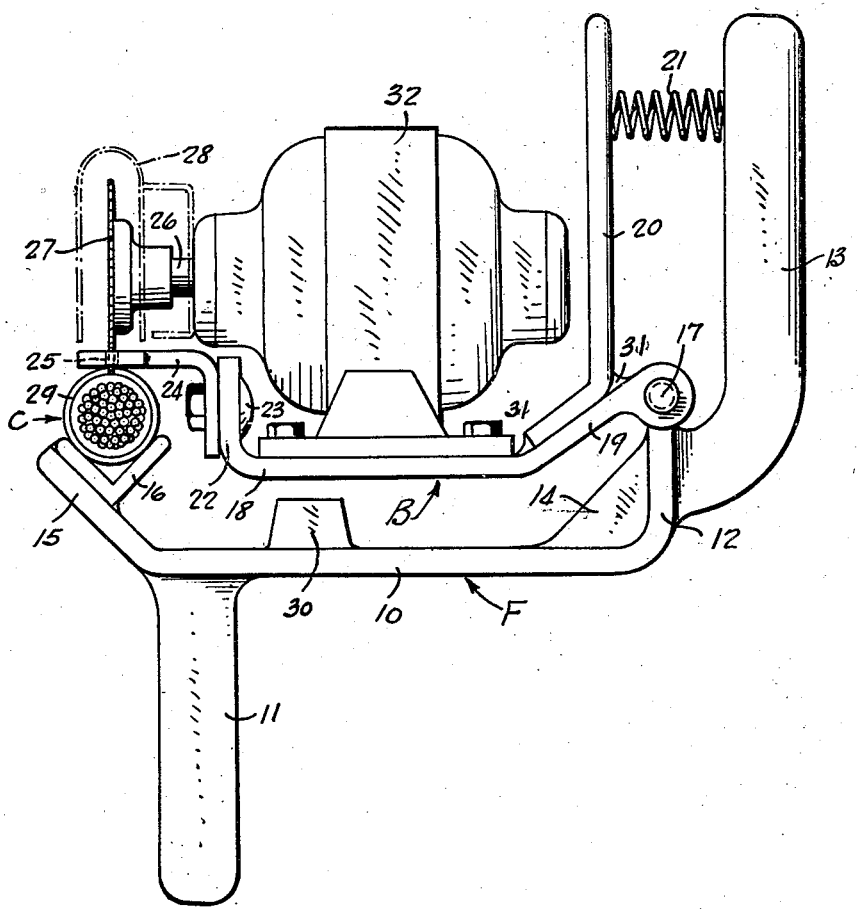
INVENTOR.
ELMOR EUGENE SHAVER
& JOSEPH L. PATTON.
BY
Joshua R. H. Potts Patented Mar. 12, 1946

2,396,442

UNITED STATES PATENT OFFICE 2,396,442

PORTABLE POWER CABLE SKINNER

Elmor Eugene Shaver, Wilmington, and Joseph L. Patton, Newport, Del.

Application September 20, 1943, Serial No. 503,088

4 Claims. (Cl. 29—69)

This invention relates to cable skinners such as are employed in the removal of metallic sheaths from cables, and is concerned primarily with the provision of a power actuated device of this type.

The practice of enclosing electrical conductors in metallic sheaths is quite widespread, and, for obvious reasons, it becomes necessary to, at times, remove the sheath or portions thereof from the cable. This requires a cutting of the metallic sheath. While certain mechanisms have been designed for this cutting operation, up to the advent of this invention such devices have been universally characterized as being manually operated. Where any extensive cable skinning operation is necessary, it is evident that the manual cutting of the sheath is carried out only with considerable labor and work by the operator. Moreover, while most cables are sheathed with a soft metal covering, such as lead, there are occasions when a harder metal or alloy is employed. These harder materials are cut only with the greatest of difficulty by the manually operable devices now available.

With the foregoing conditions in mind, this invention has in view, as its foremost objective, the provision of a cable skinner of the character aforesaid which is power actuated.

In providing a power actuated cable skinner, the conditions attending the skinning of a cable give rise to certain problems, which must be solved in order to provide a practically operable device. In the first place, supporting means for the cable which is to be skinned must be provided, and this supporting means should be capable of accommodating cables of various sizes.

Accordingly, a further object is the provision, in a power actuated cable skinner of the character aforesaid, of cable supporting means which is adapted to receive cables of various sizes within wide range.

Obviously, the cable must include a cutting element, and, in accordance with this invention, this cutting element takes the form of a disc which is preferably provided with saw teeth. An important object of the invention is the provision of means which properly correlate the cutting element to the cable support.

More in detail, the invention has, as an object, the provision of a portable power cable skinner that includes a bracket element that is mounted in a pivotal relation with respect to the cable support. The cutting element and a motor for driving the same are carried on this bracket. It is evident that the pivotal relation provides for the necessary relative movement between the cutting element and the cable support.

Inasmuch as the skinning of a cable involves the cutting of metal, it is evident that from time to time increased resistance may be encountered by the cutting element. If this cutting element is positively applied there is grave danger of damage resulting. Accordingly, a further more detailed object is the provision of yielding means for applying the cutter element to the work. This means may take the form of a spring which urges the bracket and cutting element carried thereby towards the cable support.

Various other more detailed objects and advantages of the invention, such as arise in connection with carrying out the above noted thoughts in a practical embodiment, will in part become apparent and in part be hereinafter stated as the description of the invention proceeds.

The invention, therefore, comprises a portable power cable skinner consisting of a main framework which carries a cable support adapted to receive cables of various sizes, and on which is pivotally mounted a bracket which carries a cutting element in the form of a circular saw, together with a motor for driving the cutting element. Spring means are provided for yieldably urging the cutting element towards the cable support.

For a full and more complete understanding of the invention, reference may be had to the following description and accompanying drawing, wherein the figure is a view in side elevation of a portable power cable skinner designed in accordance with the precepts of this invention.

Referring now to the drawing, wherein like reference characters denote corresponding parts, the portable power cable skinner of this invention is shown as comprising a main framework, which is referred to in its entirety by the reference character F. The framework F comprises a main body portion 10 from which depends a handle 11. At one side, the main body portion 10 terminates in an upturned flange 12, and this flange 12 in turn carries a second handle member 13. A web, shown at 14, may be included to add strength and rigidity. At the side opposite the flange 12, the main body portion 10 carries an inclined side wall 15. Mounted on the inner surface of the side wall 15 is a cable support in the form of a V-shaped trough. This V-shaped trough 16 is obviously adapted to receive cables of various sizes within a wide range.

A bracket member is referred to in its entirety by the reference character B and is shown as being pivotally mounted at 17 to the upper edge of the flange 12. The bracket B comprises a central platform 18 on which is mounted an electric motor 32. A flexible conductor (not illustrated) connects the motor 32 with a power outlet in a well-known manner. At one side, the central platform 18 is connected to the pivotal connection 17 by an inclined wall 19. Upstanding from this wall 19 is an arm 20 which may be anchored thereto as by the welding illustrated at 31, and this arm 20 is substantially parallel to the handle 13. An expansion spring shown at 21 is interposed between the arm 20 and handle 13 to urge the bracket B in the direction feeding the cutter to the work as will later be pointed out.

At the edge remote from the pivotal connection 17, the central platform 18 is formed with an upturned flange 22. Secured to this flange 22, as by the bolt shown at 23, is an L-shaped member 24, which provides an outwardly extending portion that lies over the trough 16. This L 24 is formed with a slot 25, which ordinarily is disposed substantially medially of the trough 16.

The motor 32 has a drive shaft 26, and the free end of this drive shaft carries a cutting element which preferably takes the form of the circular saw shown at 27. It will be noted that the disc 27 projects through the slot 25 a required distance so that it will perform the cutting operation. The saw 27 may be protected by any appropriate guard such as the one indicated by the broken lines designated 28.

While the operation of the above described device is believed to be obvious, it may be briefly outlined by noting that one desirous of using the device to skin a cable having a metallic sheath grasps the handles 11 and 13. The bracket B is swung back on its pivotal mounting 17 against the influence of the spring 21 and gravity action to permit the placing of a cable on the cable supporting trough 16. The cable is identified in its entirety by the reference character C, and includes the metallic sheath 29 which is to be cut by the skinning operation. When the bracket B is released, the spring 21, together with any gravity action which may be available, causes the teeth of the circular saw 27 to engage the sheath 29. The motor 32 is now started in operation, and the cutting element 27 rotates under its power. Once the sheath 29 is cut through, the L 24 engages the cable on each side of the cut and prevents the cutting operation from being carried any deeper. The operator may move the device as an entirety along the cable C and make a cut of a required length.

It is evident that the cutting element 27 is yieldably applied to the work. Thus, if any hard spots or other causes of increased resistance should be encountered, they are readily accommodated by this yielding feed.

A stop shown at 30 limits the relative movement between the central platform 18 of the bracket B and the main body portion 10 of the framework F. This positively prevents the cutting element 27 from ever damaging the cable support 16.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. In a portable power cable skinner, a framework provided with hand grips, a V-shaped cable support carried by said framework, a bracket carried by said framework and movable relative to said cable support, an electric motor on said bracket, and a rotary cutting element carried by said motor and disposed substantially opposite to said cable support with its axis arranged substantially normal to said V-shaped cable support.

2. In a portable power cable skinner, a framework provided with hand grips in spaced parallel offset relation with respect to each other, a V-shaped cable support carried by said framework substantially above one of said hand grips, a bracket carried by said framework and movable relative to said cable support, an electric motor on said bracket, a cutter element drivably connected to said motor and means cooperating with the other of said hand grips for yieldably urging said cutting element towards said cable support.

3. In a portable power cable skinner, a framework, cable supporting means on said framework, a bracket pivotally mounted on said framework, a cutting element, a motor assembly on said bracket and drivably connected to said cutting element with the cutting element arranged substantially opposite to said cable support, and a spring interposed between said bracket and framework for yieldably urging said cutting element towards said cable support.

4. In a portable power cable skinner, a framework provided with hand grips, a V-shaped cable support on said framework, a bracket pivotally mounted on said framework, an electric motor on said bracket, said motor including a drive shaft arranged substantially normal to said cable support, a circular saw carried by said drive shaft and arranged substantially opposite to said cable support, a member carried by said bracket and formed with a slot through which said saw projects, and a spring interposed between said framework and bracket for yieldably urging said saw towards said cable support.

ELMOR EUGENE SHAVER.
JOSEPH L. PATTON.